(12) United States Patent
Chang et al.

(10) Patent No.: US 11,379,982 B2
(45) Date of Patent: Jul. 5, 2022

(54) METHOD FOR TRAINING MODEL OF DEEP NEURAL NETWORK, AND METHOD AND SYSTEM USING THE MODEL TO DETERMINE WHETHER THERE IS ABNORMALITY IN BRAIN

(71) Applicant: NATIONAL YANG-MING UNIVERSITY, Taipei (TW)

(72) Inventors: Yu-Wei Chang, New Taipei (TW); Albert Chihchieh Yang, Taipei (TW); Shih-Jen Tsai, Taipei (TW)

(73) Assignee: NATIONAL YANG MING CHIAO TUNG UNIVERSITY, Taipei (TW)

( * ) Notice: Subject to any disclaimer, the term of this patent is extended or adjusted under 35 U.S.C. 154(b) by 17 days.

(21) Appl. No.: 17/160,168

(22) Filed: Jan. 27, 2021

(65) Prior Publication Data

US 2021/0256698 A1  Aug. 19, 2021

(30) Foreign Application Priority Data

Feb. 13, 2020 (TW) .................................. 109104565

(51) Int. Cl.
G06K 9/00 (2022.01)
G06T 7/00 (2017.01)

(52) U.S. Cl.
CPC .. *G06T 7/0014* (2013.01); *G06T 2207/10072* (2013.01); *G06T 2207/20084* (2013.01); *G06T 2207/30016* (2013.01)

(58) Field of Classification Search
CPC ......... G06T 7/0014; G06T 2207/10072; G06T 2207/20084; G06T 2207/30016
See application file for complete search history.

(56) References Cited

U.S. PATENT DOCUMENTS

| | | | |
|---|---|---|---|
| 6,430,430 B1 * | 8/2002 | Gosche | G06T 7/155 128/923 |
| 2009/0252391 A1 * | 10/2009 | Matsuda | G16H 30/40 382/131 |
| 2021/0015366 A1 * | 1/2021 | Agrawal | A61B 5/4064 |

* cited by examiner

*Primary Examiner* — Atiba O Fitzpatrick
(74) *Attorney, Agent, or Firm* — Hamre, Schumann, Mueller & Larson, P.C.

(57) ABSTRACT

A method for determining whether there is an abnormality in a brain includes steps of: receiving a to-be-determined (TBD) 3D brain image; implementing the calibration procedure on the TBD 3D brain image; generating a first TBD image of WM, a second TBD image of GM, and a third TBD image of CSF based on a multi-voxel pattern of the TBD 3D brain image; and inputting the first TBD image of WM into a first DNN model, the second TBD image of GM into a second DNN model, and the third TBD image of CSF into a third DNN model to determine whether there is an abnormality in the white matter, the gray matter and the cerebrospinal fluid, respectively.

20 Claims, 8 Drawing Sheets

METHOD FOR TRAINING MODEL OF DEEP NEURAL NETWORK, AND METHOD AND SYSTEM USING THE MODEL TO DETERMINE WHETHER THERE IS ABNORMALITY IN BRAIN

CROSS-REFERENCE TO RELATED APPLICATION

This application claims priority to Taiwanese Invention Patent Application No. 109104565, filed on Feb. 13, 2020.

FIELD

The disclosure relates to a method for training a model of a deep neural network, and a method and a system using the model to determine whether there is an abnormality in a brain based on a three-dimensional brain image.

BACKGROUND

In the current fast-paced and competitive world, people will be under various stress, and concomitant physiological and mental health disorders follow. According to research, globally, the number of people suffering from schizophrenia, bipolar, depression, etc., continues to rise. Furthermore, the number of people suffering from dementia or Parkinson's disease (PD) is also rising because of population aging.

Generally, by observing behavioral characteristics and observable symptoms of a patient, a psychiatrist makes diagnosis of the neuropsychosis based on experience. However, behavioral characteristics and symptoms related to mental health diagnosis do not always correlate to certain diseases or conditions, and different types of neuropsychosis may have similar behavioral characteristic and/or symptoms. Thus, some non-invasive imaging technologies, such as magnetic resonance imaging (MRI), have been developed to support clinical judgments.

SUMMARY

Therefore, an object of the disclosure is to provide a method for training a model of a deep neural network (DNN) that is to be used to determine whether there is an abnormality in a brain and that can alleviate at least one of the drawbacks of the prior art.

According to the disclosure, the method includes steps of:

receiving a plurality of reference three-dimensional (3D) brain images including 3D images of normal brains and 3D images of brains of patients having neuropsychosis, each of the plurality of reference 3D brain images having a plurality of voxels that compose a multi-voxel pattern;

for each of the plurality of reference 3D brain images, implementing a calibration procedure on the reference 3D brain image by obtaining, from the reference 3D brain image, three reference sectional images that are taken respectively on three mutually-orthogonal anatomical planes, determining whether each of the reference sectional images meets a corresponding given geometric condition by inputting the three reference sectional images respectively into three orientation-determining DNN models, and when it is determined that one of the reference sectional images does not meet the corresponding given geometric condition, rotating the reference 3D brain image about an axis that is perpendicular to one of the anatomical planes, on which said one of the reference sectional images is taken, so that the reference 3D brain image is in an orientation where said one of the reference sectional images meets the corresponding given geometric condition;

for each of the plurality of reference 3D brain images that has been processed by the calibration procedure, generating a first image of white matter (WM), a second image of gray matter (GM) and a third image of cerebrospinal fluid (CSF) based on the multi-voxel pattern of the reference 3D brain image; and inputting the first images of WF generated respectively for the plurality of reference 3D brain images into a first DNN model, the second images of GM generated respectively for the plurality of reference 3D brain images into a second DNN model, and the third images of CSF generated respectively for the plurality of reference 3D brain images into a third DNN model to train the first, second and third DNN models. The first, second and the third DNN models that have been trained are able to determine whether there is an abnormality in the white matter, the gray matter and the cerebrospinal fluid, respectively.

Another object of the disclosure is to provide a method for determining whether there is an abnormality in a brain, utilizing the trained DNN models and able to alleviate at least one of the drawbacks of the prior art.

According to the disclosure, the method includes steps of:

receiving a to-be-determined (TBD) 3D brain image, the TBD 3D brain image having a plurality of voxels that compose a multi-voxel pattern;

implementing the calibration procedure on the TBD 3D brain image by obtaining, from the TBD 3D brain image, three TBD sectional images that are taken respectively on the three anatomical planes, determining whether each of the TBD sectional images meets the corresponding given geometric condition by inputting the three TBD sectional images respectively into the three orientation-determining DNN models, and when it is determined that one of the TBD sectional images does not meet the corresponding given geometric condition, rotating the TBD 3D brain image about an axis that is perpendicular to one of the anatomical planes, on which said one of the TBD sectional images is taken, so that the TBD 3D brain image is in an orientation where said one of the TBD sectional images meets the corresponding given geometric condition;

generating, for the TED 3D brain image that has been processed by the calibration procedure, a first TED image of WM, a second TBD image of GM, and a third TBD image of CSF based on the multi-voxel pattern of the TBD 3D brain image; and inputting the first TBD image of WM into the first DNN model, the second TED image of GM into the second DNN model, and the third TED image of CSF into the third DNN model to determine whether there is an abnormality in the white matter, the gray matter and the cerebrospinal fluid, respectively.

Yet another object of the disclosure is to provide a system for determining whether there is an abnormality in a brain, utilizing the trained DNN models and able to alleviate at least one of the drawbacks of the prior art.

According to the disclosure, the system includes a computing platform. The computing platform includes a storage having stored therein the first, second and the third DNN models, a communicating device configured to receive a to-be-determined (TBD) 3D brain image, a calibration module connected to the communicating calibration module, and a processor connected to the analyzing module, the communicating device and the storage. The TBD 3D brain image has a plurality of voxels that compose a multi-voxel pattern.

The calibration module is configured to implement the calibration procedure on the TBD 3D brain image by obtaining, from the TBD 3D brain image, three TBD sectional images that are taken respectively on the three anatomical planes, determining whether each of the TBD sectional images meets the corresponding given geometric condition by inputting the three TBD sectional images respectively into the three orientation-determining DNN models, and when it is determined that one of the TBD sectional images does not meet the given geometric condition, rotating the TBD 3D brain image about an axis perpendicular to one of the anatomical planes, on which said one of the TBD sectional images is taken, so that the TBD 3D brain image is in an orientation where said one of the TBD sectional images meets the given geometric condition.

The analyzing module is configured to generate, for the TBD 3D brain image that has been processed by the calibration procedure, a first TBD image of WM, a second TBD image of GM, and a third TBD image of CSF based on the multi-voxel pattern of the TBD 3D brain image.

The processor is configured to input the first TBD image of WM into the first DNN model the second TBD image of GM into the second DNN model, and the third TBD image of CSF into the third DNN model to determine whether there is an abnormality in the white matter, the gray matter and the cerebrospinal fluid, respectively.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Figure 1:
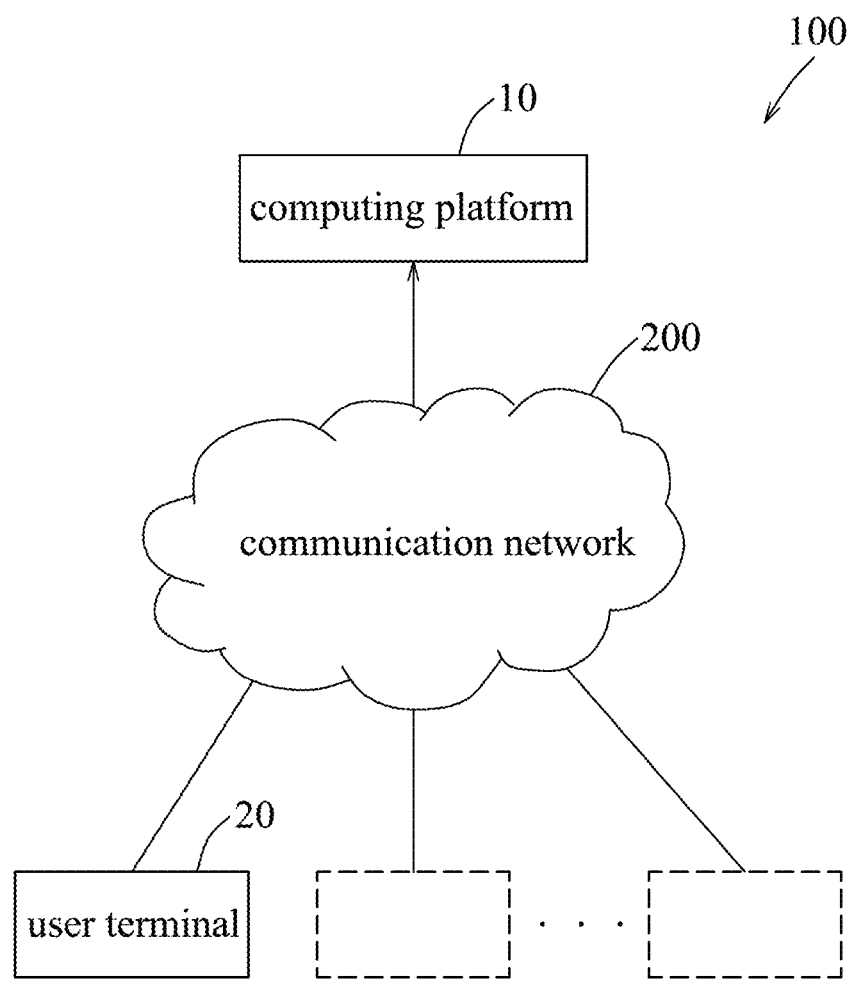
FIG. 1 is a block diagram of a system for determining whether there is an abnormality in a brain according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, an embodiment of a system 100 for determining whether there is an abnormality in a brain is used to determine whether there is any abnormal area that is related to a mental health disorder in a to-be-determined (TBD) three-dimensional (3D) brain image. The TBD 3D brain image may be a 3D magnetic resonance imaging (MRI) image, which may be produced by combining plural two-dimensional (2D) MRI scanned images together. In other embodiments, the TBD 3D brain image may be a 3D computerized tomography (CT) image. The system 100 includes a computing platform 10 and a user terminal 20 that communicates with the computing platform 10 via a communication network 200, such as the Internet. The computing platform 10 may be a server, and the user terminal 20 may be a desktop computer, a notebook computer, a tablet or a smartphone. A user may use the user terminal 20 to submit a request for a service of determining whether there is an abnormality in a brain (hereinafter referred to as "service request" for short).

Figure 2:
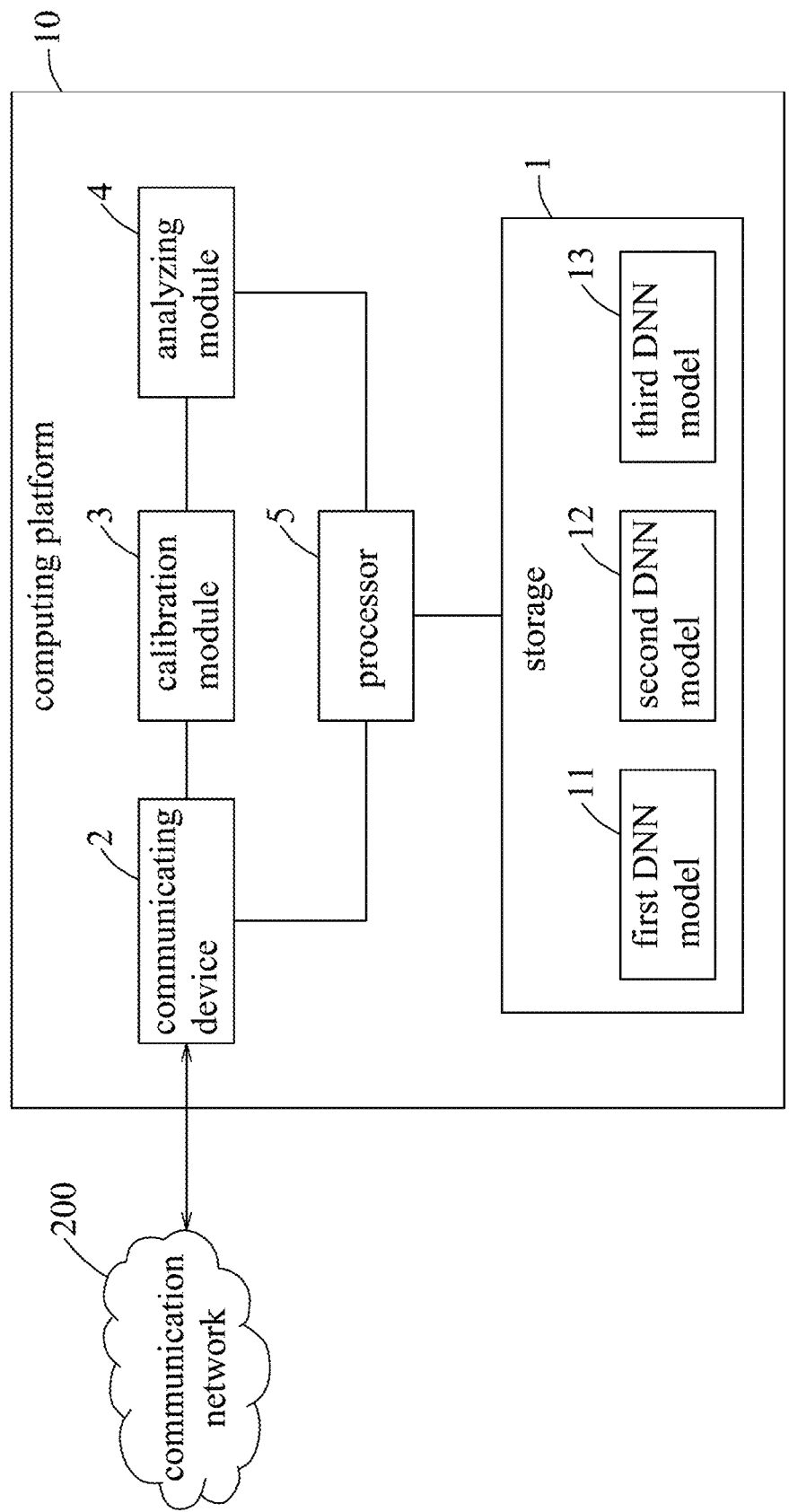
FIG. 2 is a block diagram of a computing platform of the system according to an embodiment of the disclosure.

Referring to FIG. 2, the computing platform 10 includes a storage 1, a communicating device 2 connecting to the communication network 200 for transmitting data through the communication network 200, a calibration module 3 connected to the communicating device 2, an analyzing module 4 connected to the calibration module 3, and a processor 5 connected to the storage 1, the communicating device 2 and the analyzing module 4. The calibration module 3 and the analyzing module 4 are, for example, software modules that are executed by the processor 5 to implement certain procedures that will be discussed later in this disclosure. In some embodiments, the calibration module 3 and the analyzing module 4 may be embodied in: executable software as a set of logic instructions stored in a machine- or computer-readable storage medium such as random access memory (RAM), read only memory (ROM), programmable ROM (PROM), firmware, flash memory, etc.; configurable logic such as programmable logic arrays (PLAs), field programmable gate arrays (FPGAs), complex programmable logic devices (CPLDs) etc.; fixed-functionality logic hardware using circuit technology such as application specific integrated circuit (ASIC), complementary metal oxide semiconductor (CMOS), transistor-transistor logic (TTL) technology, etc.; or any combination thereof.

In this embodiment, the storage 1 has stored therein three pre-trained deep neural network (DNN) models, including a first DNN model 11 for determining abnormalities in white matters, a second DNN model 12 for determining abnormalities in gray matters, and a third DNN model 13 for determining abnormalities in cerebrospinal fluids. The storage 1 may be embodied using one or more of a hard disk, a solid-state drive (SSD) and other non-transitory storage medium.

The communicating device 2 may include a mobile communication module supporting telecommunication using Long-Term Evolution (LTE), the third generation (3G) and/or fourth generation (4G) of wireless mobile telecommunications technology, and/or the like.

The processor 5 is, for example, a single core processor, a multi-core processor, a dual-core mobile processor, a microprocessor, a microcontroller, a digital signal processor (DSP), a field-programmable gate array (FPGA), an application specific integrated circuit (ASIC), or a radio-frequency integrated circuit (RFIC), etc.

Figure 3:
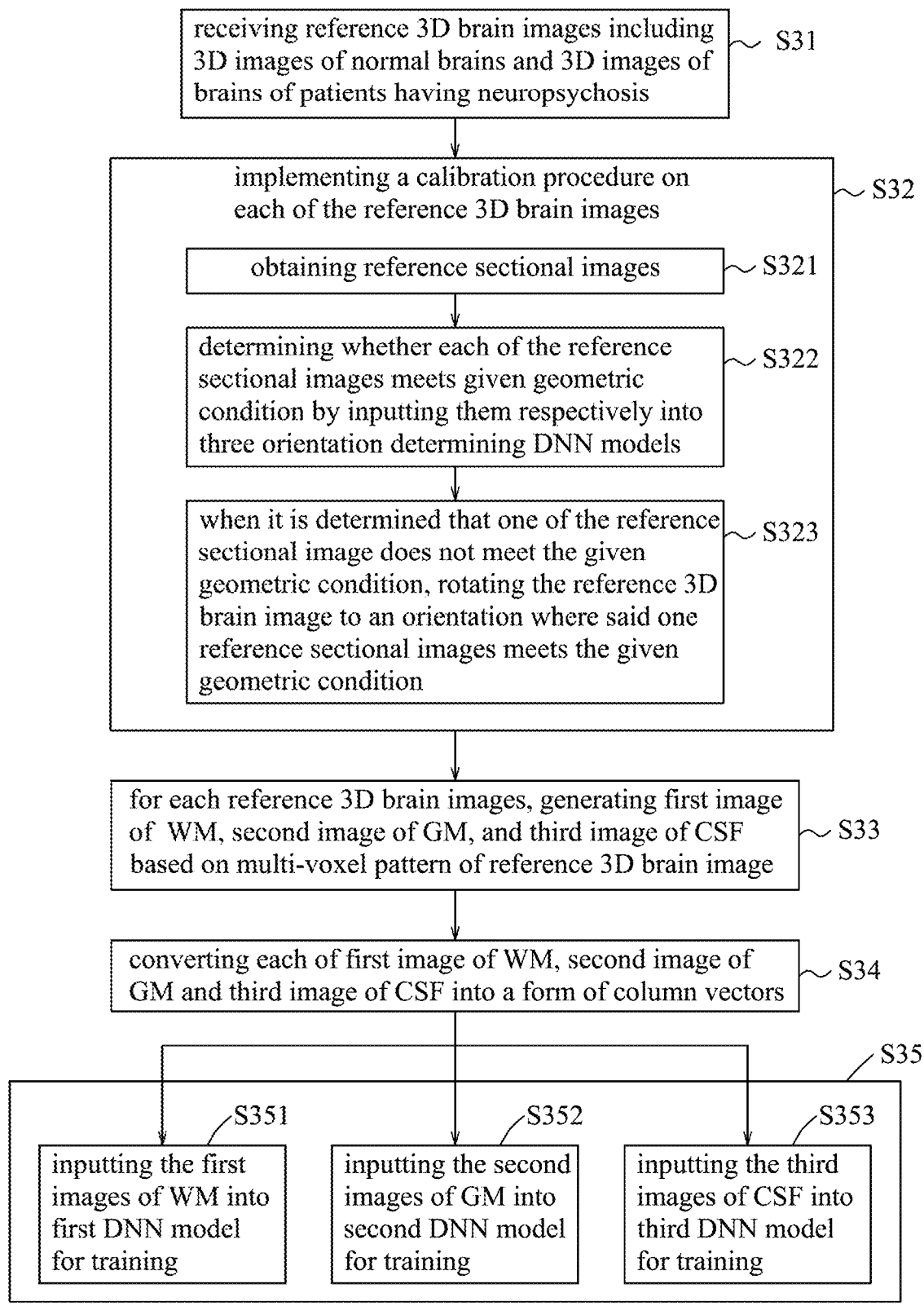
FIG. 3 is a flow chart illustrating an embodiment of a method for training a model of a deep neural network (DNN) that is to be used to determine whether there is an abnormality in a brain.

Further referring to FIG. 3, the first DNN model 11, the second DNN model 12 and the third DNN model 13 are trained by the computing platform 10 with the following steps.

In step S31, the communicating device 2 receives a plurality of reference 3D brain images from an external source. The plurality of reference 3D brain images include 3D images of normal brains and 3D images of brains of patients with neuropsychosis (e.g., schizophrenia). Each of the plurality of reference 3D brain images has a plurality of voxels that compose a multi-voxel pattern. In some embodiments, the plurality of reference 3D brain images may be pre-stored in the storage 1.

In step S32, the calibration module 3 implements a calibration procedure on each of the plurality of reference 3D brain images. In this embodiment, step S32 includes sub-steps S321 to S323 to be conducted with respect to each of the plurality of reference 3D brain images.

Figure 4:
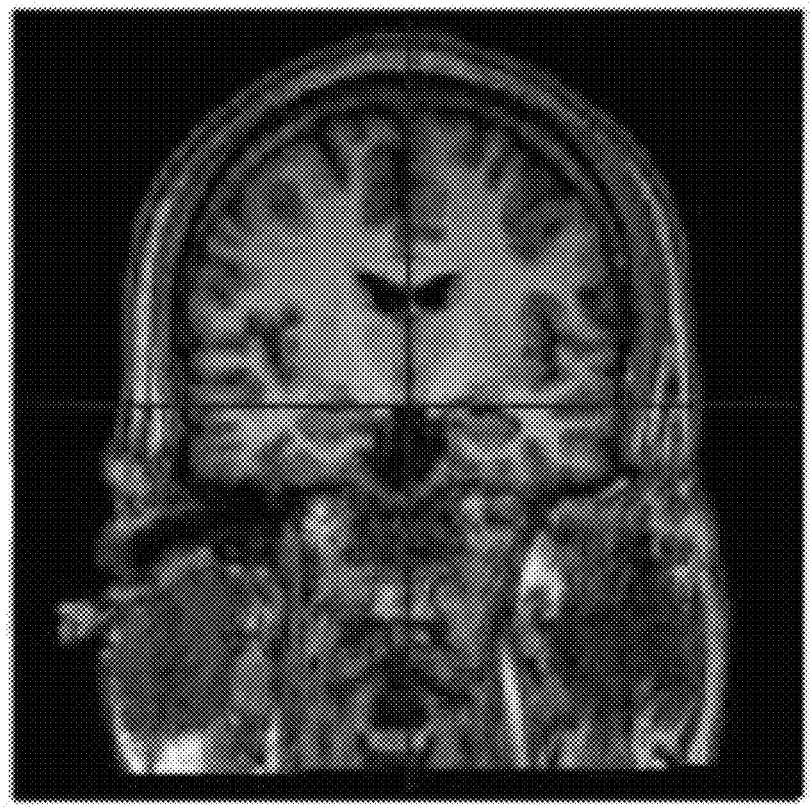
FIG. 4 is a coronal-sectional image of a brain on a coronal plane.
Figure 5:
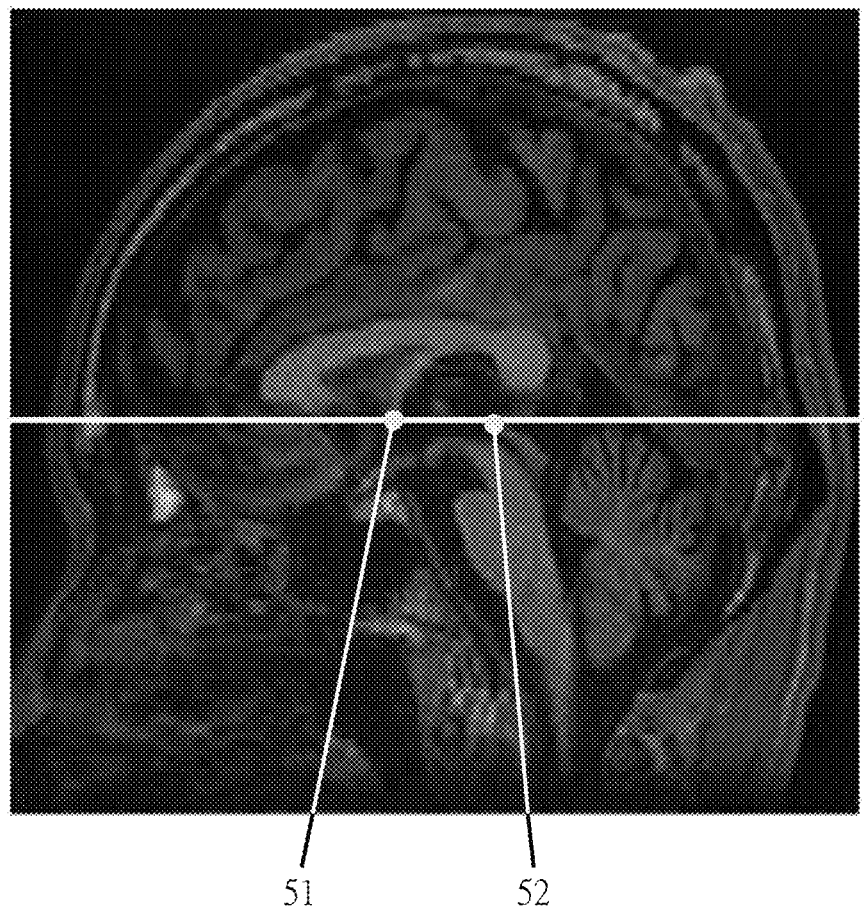
FIG. 5 is a sagittal-sectional image of a brain on a sagittal plane.
Figure 6:
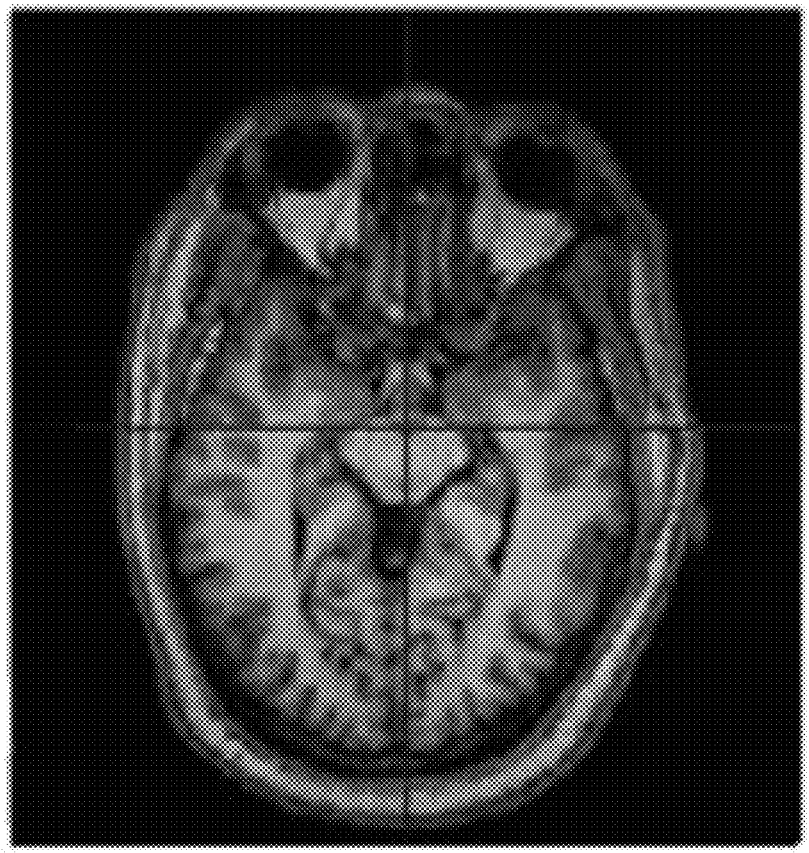
FIG. 6 is an axial-sectional image of a brain on an axial plane.

Specifically, the calibration module 3 implements sub-step S321 to obtain, from the reference 3D brain image, three reference sectional images that are taken respectively on three mutually-orthogonal anatomical planes. In this embodiment, the three reference sectional images include a reference coronal-sectional image on a coronal plane (see FIG. 4), a reference sagittal-sectional image on a sagittal plane (see FIG. 5), and a reference axial-sectional image on an axial plane (see FIG. 6).

Then, in sub-step S322, the calibration module 3 determines whether each of the reference sectional images meets a corresponding given geometric condition by inputting the three reference sectional images respectively into three orientation-determining DNN models (not shown) that are built with a convolutional neural network (CNN). Specifically, the orientation-determining DNN models determine whether the inputted reference coronal-sectional image is symmetrical, whether the inputted reference sagittal-sectional image is horizontal, and whether the inputted reference axial-sectional image is symmetrical, respectively. More specifically, a first one of the orientation-determining DNN models determines whether the reference coronal-sectional image is symmetrical by dividing the reference coronal-sectional image into a left part and a right part, and determining whether the left part of the reference coronal-sectional image is symmetrical to the right part of the reference coronal-sectional image; a second one of the orientation-determining DNN models determines whether the reference sagittal-sectional image is horizontal by finding two specific feature points 51, 52 on the reference sagittal-sectional image, and determining whether a line connecting the two specific feature points 51, 52 is horizontal; and a third one of the orientation-determining DNN models determines whether the reference axial-sectional image is symmetrical by dividing the reference axial-sectional image into a left part and a right part, and determining whether the left part of the reference axial-sectional image is symmetrical to the right part of the reference axial-sectional image. In this embodiment, the two specific feature points 51, 52 on the reference sagittal-sectional image are respectively an anterior commissure point and a posterior commissure point that may be recognized with reference to pre-determined feature-point patterns. To determine whether the reference sagittal-sectional image is horizontal, the calibration module 3 first computes an angle between a horizontal edge of the reference sagittal-sectional image and the line connecting the anterior commissure point and the posterior commissure point, and then determines whether the angle is zero. When it is determined that the angle is zero, the calibration module 3 determines that the reference sagittal-sectional image is horizontal. When the angle is not zero, the calibration module 3 determines that the reference sagittal-sectional image is not horizontal (does not meet the given geometric condition).

In sub-step S323, when it is determined that one of the reference sectional images does not meet the corresponding given geometric condition, the calibration module 3 rotates the reference 3D brain image about an axis that is perpendicular to one of the anatomical planes, on which said one of the reference sectional images is taken, so that the reference 3D brain image is in an orientation where said one of the reference sectional images meets the corresponding given geometric condition. For example, when it is determined that the reference sagittal-sectional image is not horizontal, the calibration module 3 rotates the reference 3D brain image about the axis perpendicular to the sagittal plane until the reference 3D brain image is in an orientation where the reference sagittal-sectional image is horizontal. With the angle between the horizontal edge of the reference sagittal-sectional image and the line connecting the anterior commissure point and the posterior commissure point being calculated already, the reference 3D brain image should be rotated by the calculated angle. After the calibration procedure, deviation of the reference 3D brain image from desired orientation as attributed to movements of person who was receiving MRI scans may be offset.

In step S33, the analyzing module 4 generates, for each of the reference 3D brain images that has been processed by the calibration procedure, a first image of white matter (WM), a second image of gray matter (GM), and a third image of cerebrospinal fluid (CSF) based on the multi-voxel pattern of the reference 3D brain image. The multi-voxel pattern shows intensity of each voxel (i.e., a value of the voxel). Since WM generally has intensity distribution of from 7,500 to 22,500 a.u., GM generally has intensity distribution of from 5,500 to 20,000 a.u., and CSF generally has intensity distribution of from 0 to 13,000 a.u., the analyzing module 4 may use statistical analysis to generate the first image of WM, the second image of GM and the third image of CSF accordingly. In one embodiment, the analyzing module 4 may generate the first image of WM, the second image of GM and the third image of CSF in a manner as described in "Handbook of Functional MRI Data Analysis, 1st Edition, Russell A Poldrack," which is incorporated by reference herein.

In step S34, the processor 5 converts each of the first image of WM, the second image of GM and the third image of CSF into a form of column vectors for reducing computational complexity.

In step S35, the processor 5 trains the first, second and third DNN models 11, 12, 13 by implementing the following sub-steps S351 to S353. In some embodiments, sub-steps S351 to S353 are implemented at the same time.

In sub-step S351, the processor 5 inputs the first images of WM that are generated respectively for the plurality of reference 3D brain images (in the form of column vectors) into the first DNN model 11 to train the first DNN model 11. The first DNN model 11 that has been trained is able to determine abnormalities in the white matter.

In sub-step S352, the processor 5 inputs the second images of GM that are generated respectively for the plurality of reference 3D brain images (in the form of column vector) into the second DNN model 12 to train the second DNN model 12. The second DNN model 12 that has been trained is able to determine abnormalities in the gray matter.

In sub-step S353, the processor 5 inputs the third images of CSF that are generated respectively for the plurality of reference 3D brain images (in the form of column vector) into the third DNN model 13 to train the third DNN model 13. The third DNN model 13 that has been trained is able to determine abnormalities in the cerebrospinal fluid.

Figure 7:
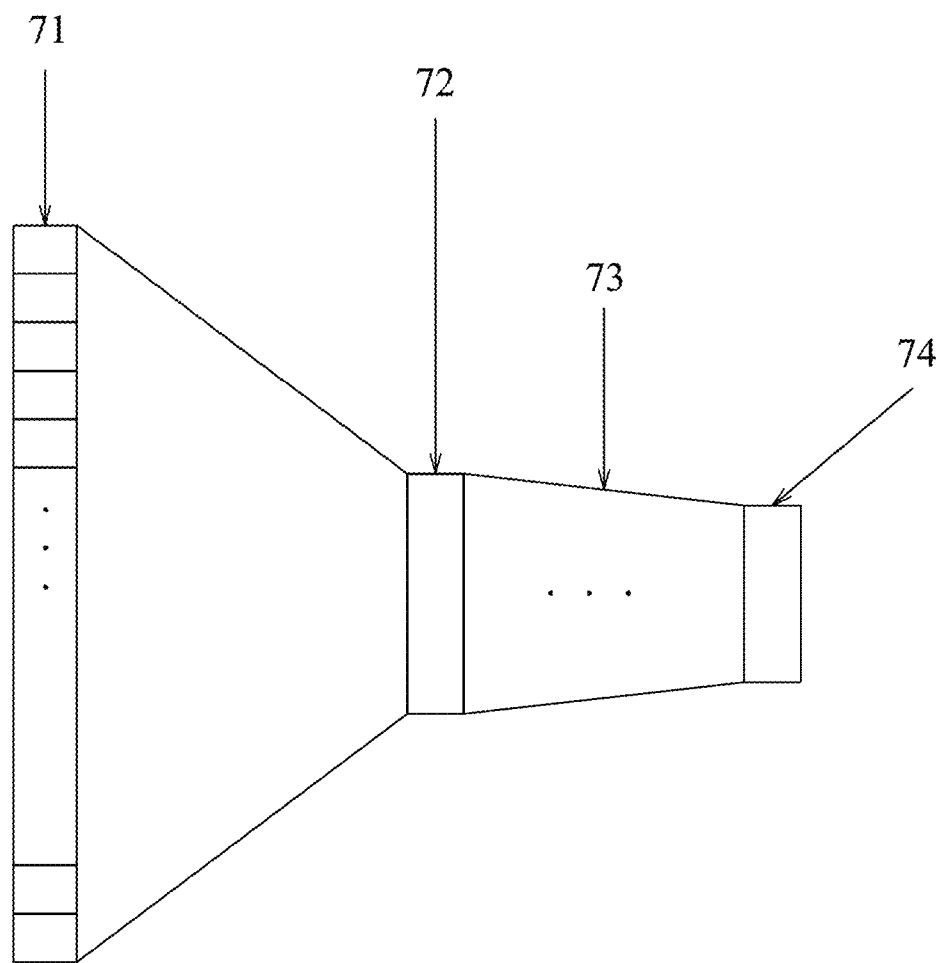
FIG. 7 is a schematic view illustrating a framework of a DNN model.

Referring to FIG. 7, the framework of each of the first, the second and the third DNN models 11, 12, 13 includes an input layer 71, a feature selection layer 72, a set of stacking hidden layers 73, and an output layer 74.

In practice, half of the 3D images of normal brains and half of the 3D images of brains of patients having neuropsychosis may be used to train the first, the second and the third DNN models 11, 12, 13 in the manner as described above, and the remaining 3D images may be used to check the accuracy of the first, the second and the third DNN models 11, 12, 13, and to adjust function sets or parameters of these models 11, 12, 13. In this way, accuracy of determinations made by the first, the second and the third DNN models 11, 12, 13 may be further improved.

Figure 8:
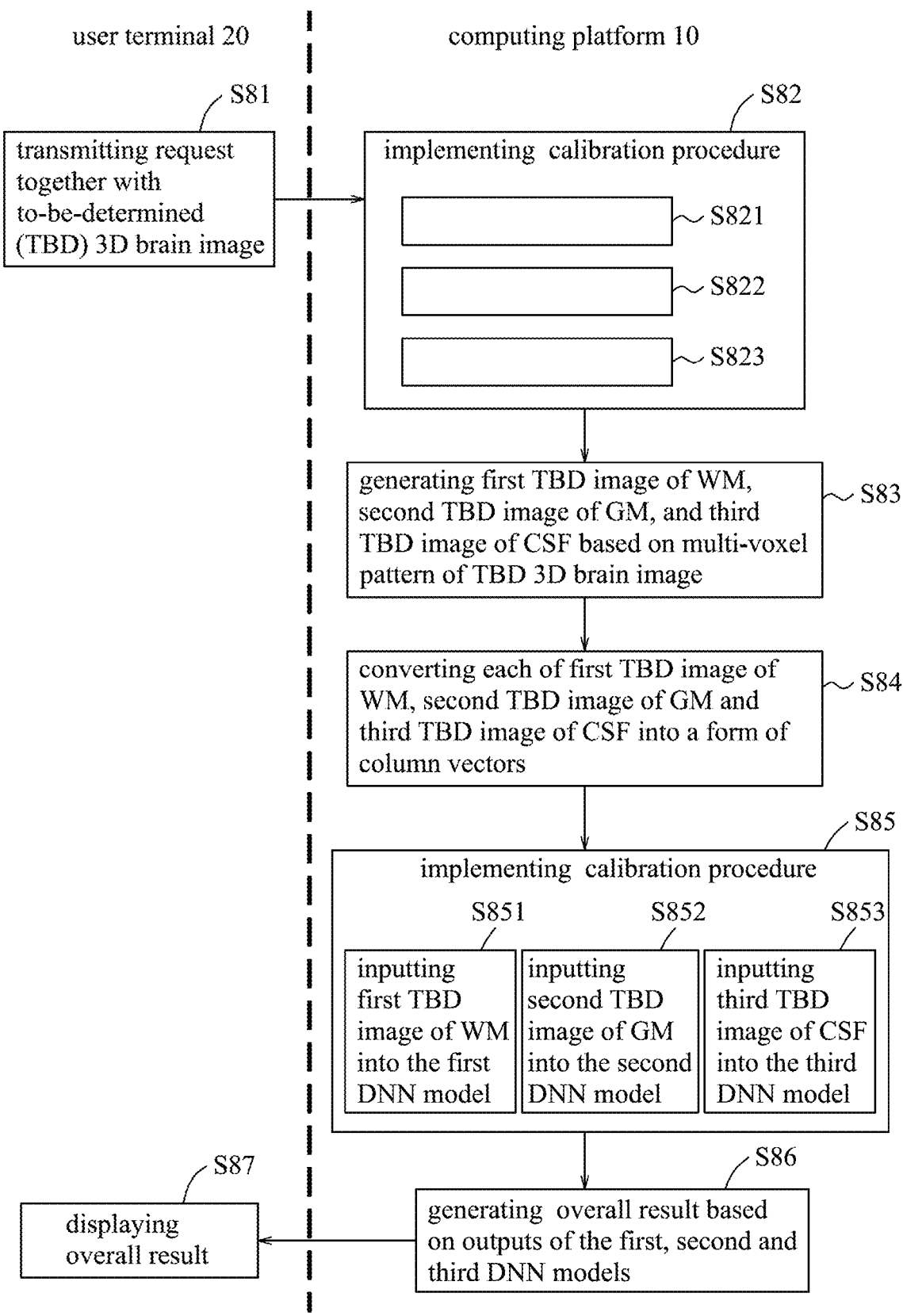
FIG. 8 is flow chart illustrating an embodiment of a method for determining whether there is an abnormality in a brain.

Referring to FIG. 8, a method for determining whether there is an abnormality in a brain includes the following steps S81 to S87, and is implemented, for example, by the system 100 shown in FIGS. 1 and 2.

In step S81, the user terminal 20 transmits a service request together with a TBD 3D brain image, via the communication network 200, to the computing platform 10.

In step S82, the calibration module 3 receives the service request and the TBD 3D brain image via the communicating device 2, and implements the calibration procedure on the TBD 3D brain image (sub-step S821 to S823).

In sub-step S821, the calibration module 3 obtains, from the TBD 3D brain image, three TBD sectional images including a TBD coronal-sectional image on the coronal plane, a TBD sagittal-sectional image on the sagittal plane and a TBD axial-sectional image on the axial plane.

In sub-step S822, the calibration module 3 determines whether each of the TBD sectional images meets the corresponding given geometric condition by inputting the three TBD sectional images respectively into the three orientation-determining DNN models. Specifically, the orientation-determining DNN models determine whether the TBD coronal-sectional image is symmetrical, whether the TBD sagittal-sectional image is horizontal, and whether the TBD axial-sectional image is symmetrical. The determination made by the calibration module 3 in sub-step S822 is similar to that in sub-step S322 and will not be described again for the sake of brevity.

In sub-step S823, when it is determined that one of the TBD sectional images does not meet the corresponding given geometric condition, the calibration module 3 rotates the TBD 3D brain image about an axis that is perpendicular to one of the anatomical planes, on which said one of the TBD sectional images is taken, so that the TBD 3D brain image is in an orientation where said one of the TBD sectional images meets the corresponding given geometric condition. The details of sub-step S823 are similar to the details of sub-step S323 and will not be repeated again for the sake of brevity.

In step S83, the analyzing module 4 generates, for the TBD 3D brain image that has been processed by the calibration procedure, a first TBD image of WM, a second TBD image of GM, and a third TBD image of CSF based on the multi-voxel pattern of the TBD 3D brain image.

In step S84, the processor 5 converts each of the first TBD image of WM, the second TBD image of GM and the third TBD image of CSF into a form of column vectors.

In step S85, the processor 5 determines whether there is an abnormality in the brain by implementing the following sub-steps S851 to S853. In some embodiments, sub-steps S851 to S853 are implemented at the same time.

In sub-step S851, the processor 5 inputs the first TBD image of WM in the form of column vectors into the first DNN model 11 to determine whether there is an abnormality in the white matter of the brain. Specifically, the first DNN model 11 determines whether there is an abnormal area in the first TBD image of WM, and determines location information of the abnormal area in the first TBD image, if any.

In sub-step S852, the processor 5 inputs the second TBD image of GM in the form of column vectors into the second DNN model 12 to determine whether there is an abnormality in the gray matter of the brain. Specifically, the second DNN model 12 determines whether there is an abnormal area in the second TBD image of GM, and determines location information of the abnormal area in the second TBD image, if any.

In sub-step S853, the processor 5 inputs the third TBD image of CSF in the form of column vector into the third DNN model 13 to determine whether there is an abnormality in the cerebrospinal fluid. Specifically, the third DEN model 13 determines whether there is an abnormal area in the third TBD image of CSF, and determines location information of the abnormal area in the third TBD image, if any.

In this embodiment, the first DNN model 11 may generate an output of "TRUE 1" when it is determined that there is an abnormal area in the first TBD image of WM, and generate an output of "FALSE 1" when otherwise. The second DEN model 12 may generate an output of "TRUE 2" when it is determined that there is an abnormal area in the second TBD image of GM, and generate an output of "FALSE 2" when otherwise. The third DNN model 13 may generate an output of "TRUE 3" when it is determined that there is an abnormal area in the third TBD image of CSF, and generate an output of "FALSE 3" when otherwise.

In step S86, the processor 5 generates an overall result based on the outputs of the first, second and third DNN models 11, 12 and 13. In some embodiments, the processor 5 further marks label(s) on the TBD 3D brain image according to the location information of the first TBD image when it is determined that there is an abnormal area therein, the location information of the second TED image when it is determined that there is an abnormal area therein, and the location information of the third TBD image when it is determined that there is an abnormal area therein.

In step S87, the user terminal 20 receives the overall result from the processor 5 of the computing platform 10 and displays the overall result.

In summary, the first DNN model 11 for determining abnormalities in white matters, the second DNN model 12 for determining abnormalities in gray matters, and the third DNN model 13 for determining abnormalities in cerebrospinal fluids are pre-trained after reference 3D brain images, which are used to train the DNN models 11-13, have been calibrated through the calibration procedure, thus the accuracy of these models 11-13 may be improved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for training a model of a deep neural network (DNN) that is to be used to determine whether there is an abnormality in a brain, the method comprising steps of:
receiving a plurality of reference three-dimensional (3D) brain images including 3D images of normal brains and 3D images of brains of patients having neuropsychosis, each of the plurality of reference 3D brain images having a plurality of voxels that compose a multi-voxel pattern;
for each of the plurality of reference 3D brain images, implementing a calibration procedure on the reference 3D brain image by
obtaining, from the reference 3D brain image, three reference sectional images that are taken respectively on three mutually-orthogonal anatomical planes,
determining whether each of the reference sectional images meets a corresponding given geometric condition by inputting the three reference sectional images respectively into three orientation-determining DNN models, and
when it is determined that one of the reference sectional images does not meet the corresponding given geometric condition, rotating the reference 3D brain image about an axis perpendicular to one of the anatomical planes, on which said one of the reference sectional images is taken, so that the reference 3D brain image is in an orientation where said one of the reference sectional images meets the corresponding given geometric condition;
for each of the plurality of reference 3D brain images that has been processed by the calibration procedure, generating a first image of white matter (WM), a second image of gray matter (GM) and a third image of cerebrospinal fluid (CSF) based on the multi-voxel pattern of the reference 3D brain image; and
inputting the first images of WF generated respectively for the plurality of reference 3D brain images into a first DNN model, the second images of GM generated respectively for the plurality of reference 3D brain images into a second DNN model, and the third images of CSF generated respectively for the plurality of reference 3D brain images into a third DNN model to train the first, second and third DNN models,
wherein the first, second and the third DNN models that have been trained are able to determine whether there is an abnormality in the white matter, whether there is an abnormality in the gray matter and whether there is an abnormality in the cerebrospinal fluid, respectively.

2. The method of claim 1, wherein the step of obtaining three reference sectional images from the reference 3D brain image is to obtain a reference coronal-sectional image on a coronal plane, a reference sagittal-sectional image on a sagittal plane and a reference axial-sectional image on an axial plane,
wherein the step of determining whether each of the reference sectional images meets a corresponding given geometric condition includes sub-steps of determining whether the reference coronal-sectional image is symmetrical, determining whether the reference sagittal-sectional image is horizontal, and determining whether the reference axial-sectional image is symmetrical.

3. The method of claim 2, wherein the three orientation-determining DNN models are built with a convolutional neural network (CNN).

4. The method of claim 2, wherein:
the sub-step of determining whether the reference coronal-sectional image is symmetrical includes dividing the reference coronal-sectional image into a left part and a right part, and determining whether the left part of the reference coronal-sectional image is symmetrical to the right part of the reference coronal-sectional image;
the sub-step of determining whether the reference sagittal-sectional image is horizontal includes finding two specific feature points on the reference sagittal-sectional image, and determining whether a line connecting the two specific feature points is horizontal; and
the sub-step of determining whether the reference axial-sectional image is symmetrical includes dividing the reference axial-sectional image into a left part and a right part, and determining whether the left part of the reference axial-sectional image is symmetrical to the right part of the reference axial-sectional image.

5. The method of claim 2, wherein the sub-step of determining whether the reference sagittal-sectional image is horizontal includes:
recognizing an anterior commissure point and a posterior commissure point on the reference sagittal-sectional image with reference to pre-determined feature-point patterns;
computing an angle between a horizontal edge of the reference sagittal-sectional image and a line connecting the anterior commissure point and the posterior commissure point;
determining whether the angle is zero; and
when it is determined that the angle is zero, determining that the reference sagittal-sectional image is horizontal.

6. The method of claim 1, further comprising a step of:
converting each of the first image of WM, the second image of GM, and the third image of CSF into a form of column vectors.

7. A method for determining whether there is an abnormality in a brain utilizing DNN models that have been trained by the method of claim 1, comprising steps of:
receiving a to-be-determined (TBD) 3D brain image, the TBD 3D brain image having a plurality of voxels that compose a multi-voxel pattern;
implementing the calibration procedure on the TBD 3D brain image by
obtaining, from the TBD 3D brain image, three TBD sectional images that are taken respectively on the three anatomical planes,
determining whether each of the TBD sectional images meets the corresponding given geometric condition by inputting the three TBD sectional images respectively into the three orientation-determining DNN models, and
when it is determined that one of the TBD sectional images does not meet the corresponding given geometric condition, rotating the TBD 3D brain image about an axis perpendicular to one of the anatomical planes, on which said one of the TBD sectional images is taken, so that the TBD 3D brain image is in an orientation where said one of the TBD sectional images meets the corresponding given geometric condition;

generating, for the TBD 3D brain image that has been processed by the calibration procedure, a first TBD image of WM, a second TBD image of GM, and a third TBD image of CSF based on the multi-voxel pattern of the TBD 3D brain image; and inputting the first TBD image of WM into the first DNN model, the second TBD image of GM into the second DNN model, and the third TBD image of CSF into the third DNN model to determine whether there is an abnormality in the white matter, the gray matter and the cerebrospinal fluid, respectively.

8. The method of claim 7, wherein the step of inputting the first TBD image, the second TBD image and the third TBD image respectively into the first, second and third DNN models to determine whether there is an abnormality in the white matter, the gray matter and the cerebrospinal fluid includes determining whether there is an abnormal area in the first TBD image of WM, and determining location information of the abnormal area in the first TBD image, if any;

determining whether there is an abnormal area in the second TBD image of GM, and determining location information of the abnormal area in the second TBD image, if any; and determining whether there is an abnormal area in the third TBD image of CSF, and determining location information of the abnormal area in the third TBD image, if any.

9. The method of claim 8, further comprising a step of: for each of the first, second and third TBD images that is determined as having an abnormal area, marking a label on the TBD 3D brain image according to the location information of the abnormal area.

10. The method of claim 8, wherein the step of obtaining three TBD sectional images from the TBD 3D brain image is to obtain a TBD coronal-sectional image on the coronal plane, a TBD sagittal-sectional image on the sagittal plane and a TBD axial-sectional image on the axial plane, wherein the step of determining whether each of the TBD sectional images meets the corresponding given geometric condition includes sub-steps of determining whether the TBD coronal-sectional image is symmetrical, determining whether the TBD sagittal-sectional image is horizontal, and determining whether the TBD axial-sectional image is symmetrical.

11. The method of claim 10, wherein:

the sub-step of determining whether the TBD coronal-sectional image is symmetrical includes dividing the TBD coronal-sectional image into a left part and a right part, and determining whether the left part of the TBD coronal-sectional image is symmetrical to the right part of the TBD coronal-sectional image;

the sub-step of determining whether the TBD sagittal-sectional image is horizontal includes finding two specific feature points on the TBD sagittal-sectional image, and determining whether a line connecting the two specific feature points is horizontal; and the sub-step of determining whether the TBD axial-sectional image is symmetrical includes dividing the TBD axial-sectional image into a left part and a right part, and determining whether the left part of the TBD axial-sectional image is symmetrical to the right part of the TBD axial-sectional image.

12. The method of claim 8, wherein the sub-step of determining whether the TBD sagittal-sectional image is horizontal includes:

recognizing an anterior commissure point and a posterior commissure point on the TBD sagittal-sectional image with reference to pre-determined sagittal-sectional patterns;

computing an angle between a horizontal edge of the TBD sagittal-sectional image and a line connecting the anterior commissure point and the posterior commissure point;

determining whether the angle is zero; and when it is determined that the angle is zero, determining that the TED sagittal-sectional image is horizontal.

13. The method of claim 7, further comprising a step of: converting each of the first TBD image of WM, the second TED image of GM, and the third TED image of CSF into a form of column vectors.

14. A system (100) for determining whether there is an abnormality in a brain utilizing DNN models that have been trained by the method of claim 1, comprising a computing platform (10) that includes:

a storage (1) having stored therein the first, second and the third DNN models (11, 12, 13);

a communicating device (2) configured to receive a to-be-determined (TED) 3D brain image, the TBD 3D brain image having a plurality of voxels that compose a multi-voxel pattern;

a calibration module (3) connected to the communicating device (2), and configured to implement the calibration procedure on the TBD 3D brain image by obtaining, from the TBD 3D brain image, three TED sectional images that are taken respectively on the three anatomical planes, determining whether each of the TED sectional images meets the corresponding given geometric condition by inputting the three TBD sectional images respectively into the three orientation-determining DNN models, and when it is determined that one of the TBD sectional images does not meet the corresponding given geometric condition, rotating the TED 3D brain image about an axis that is perpendicular to one of the anatomical planes, on which said one of the TBD sectional images is taken, so that the TBD 3D brain image is in an orientation where said one of the TBD sectional images meets the corresponding given geometric condition;

an analyzing module (4) connected to said calibration module (3), and configured to generate, for the TED 3D brain image that has been processed by the calibration procedure, a first TED image of WM, a second TED image of GM, and a third TBD image of CSF based on the multi-voxel pattern of the TED 3D brain image; and a processor (5) connected to said analyzing module (4), said communicating device (2) and said storage (1), and configured to input the first TED image of WM into the first DNN model (11), the second TBD image of GM into the second DNN model (12), and the third TED image of CSF into the third DNN model (13) to determine whether there is an abnormality in the white matter, the gray matter and the cerebrospinal fluid, respectively.

15. The system (100) of claim 14, wherein said processor (5) is configured to determine whether there is an abnormality in the white matter, the gray matter and the cerebrospinal fluid by:
- determining whether there is an abnormal area in the first TED image of WM, and determining location information of the abnormal area in the first TBD image, if any;
- determining whether there is an abnormal area in the second TBD image of GM, and determining location information of the abnormal area in the second TBD image, if any; and
- determining whether there is an abnormal area in the third TBD image of CSF, and determining location information of the abnormal area in the third TED image, if any.

16. The system (100) of claim 15, wherein, for each of the first, second and third TED images that is determined as having an abnormal area, said processor (5) is configured to further mark a label on the TBD 3D brain image according to the location information of the abnormal area.

17. The system (100) of claim 14, wherein said calibration module (3) is configured to:
- obtain a TBD coronal-sectional image on the coronal plane, a TBD sagittal-sectional image on the sagittal plane and a TED axial-sectional image on the axial plane; and
- determine whether the TED coronal-sectional image is symmetrical, determine whether the TED sagittal-sectional image is horizontal, and determine whether the TBD axial-sectional image is symmetrical.

18. The system (100) of claim 17, wherein said calibration module (3) is configured to:
- determine whether the TBD coronal-sectional image is symmetrical by dividing the TBD coronal-sectional image into a left part and a right part, and determining whether the left part of the TBD coronal-sectional image is symmetrical to the right part of the TBD coronal-sectional image;
- determine whether the TBD sagittal-sectional image is horizontal by finding two specific feature points on the TBD sagittal-sectional image, and determining whether a line connecting the two specific feature points is horizontal; and
- determine whether the TBD axial-sectional image is symmetrical by dividing the TBD axial-sectional image into a left part and a right part, and determining whether the left part of the TBD axial-sectional image is symmetrical to the right part of the TBD axial-sectional image.

19. The system (100) of claim 17, wherein said calibration module (3) is configured to determine whether the TBD sagittal-sectional image is horizontal by:
- recognizing an anterior commissure point and a posterior commissure point on the TBD sagittal-sectional image with reference to pre-determined sagittal-sectional patterns;
- computing an angle between a horizontal edge of the TBD sagittal-sectional image and a line connecting the anterior commissure point and the posterior commissure point;
- determining whether the angle is zero; and
- when it is determined that the angle is zero, determining that the TBD sagittal-sectional image is horizontal.

20. The system (100) of claim 14, further comprising a user terminal (20) that communicates with said computing platform (10) via a communication network (200), and that is configured to transmit, to said computing platform (10), a request for determining whether there is an abnormality in a brain, together with the TBD 3D brain image.

* * * * *